United States Patent [19]

Kohl

[11] Patent Number: 4,788,088

[45] Date of Patent: Nov. 29, 1988

[54] APPARATUS AND METHOD OF MAKING A REINFORCED PLASTIC LAMINATE STRUCTURE AND PRODUCTS RESULTING THEREFROM

[76] Inventor: John O. Kohl, 229 S. Sixth St., Bayport, Minn. 55003

[21] Appl. No.: 914,503

[22] Filed: Oct. 2, 1986

Related U.S. Application Data

[62] Division of Ser. No. 784,423, Oct. 4, 1985, abandoned.

[51] Int. Cl.$^4$ .............................. B32B 23/02
[52] U.S. Cl. .................. 428/34.5; 428/192; 428/247; 428/36.2; 428/35.6; 428/35.9; 428/34.2
[58] Field of Search ............ 428/34, 35, 36, 247, 428/192; 269/173; 425/114

[56] References Cited

U.S. PATENT DOCUMENTS

| | | | |
|---|---|---|---|
| 1,933,019 | 10/1933 | Laubi | 264/174 |
| 2,687,553 | 8/1954 | Colombo | 425/114 |
| 2,938,566 | 5/1960 | Toulmin, Jr. | 264/103 |
| 3,533,884 | 10/1970 | Quackenbush | 425/114 |
| 3,550,203 | 12/1970 | Lemelson | 264/174 |
| 3,579,623 | 5/1971 | Thomson et al. | 264/174 |
| 3,649,731 | 3/1972 | Cronin | 425/114 |
| 4,435,466 | 3/1984 | Kuhnel et al. | 428/247 |
| 4,479,988 | 10/1984 | Dawson | 428/34 |
| 4,588,546 | 5/1986 | Feil et al. | 264/174 |
| 4,603,712 | 8/1986 | Krause | 428/36 |

Primary Examiner—George F. Lesmes
Assistant Examiner—James J. Seidleck
Attorney, Agent, or Firm—Jenner & Block

[57] ABSTRACT

The present invention provides a reinforced plastic laminate structure comprising an elongated reinforcing material that is encapsulated by an extruded plastic material that forms a continuous structure around the reinforcing material. The present invention contemplates methods of extruding a tube of plastic material while simultaneously introducing a reinforcing material within the interior of the tube. Thereafter, the tube is flattened so that the interior wall of the tube comes in contact with the reinforcing material to encapsulate the reinforcing material in a continuous structure. The reinforced plastic laminate sheet is made from an apparatus an extruding machine for extruding plastic with an annular die and opening for the extruding tubing. Attached to the extruding machine is a mandrel which feeds a reinforcing material into the center of the annular opening. Pressure rollers flatten the tubing after it exits from the annular die. The reinforcing plastic material may be formed into a variety of useful products where increased strength is required. The ease of manufacture provides a cost advantage over conventional construction materials.

13 Claims, 12 Drawing Sheets

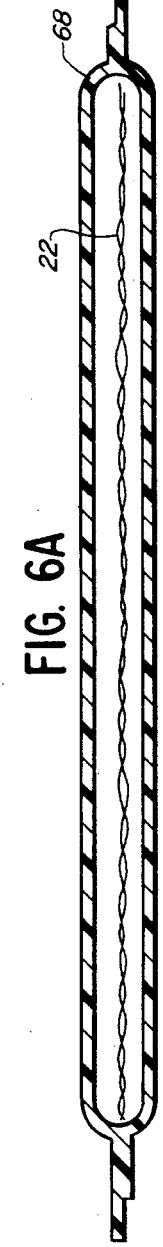
FIG. 6A
FIG. 6B
FIG. 6C
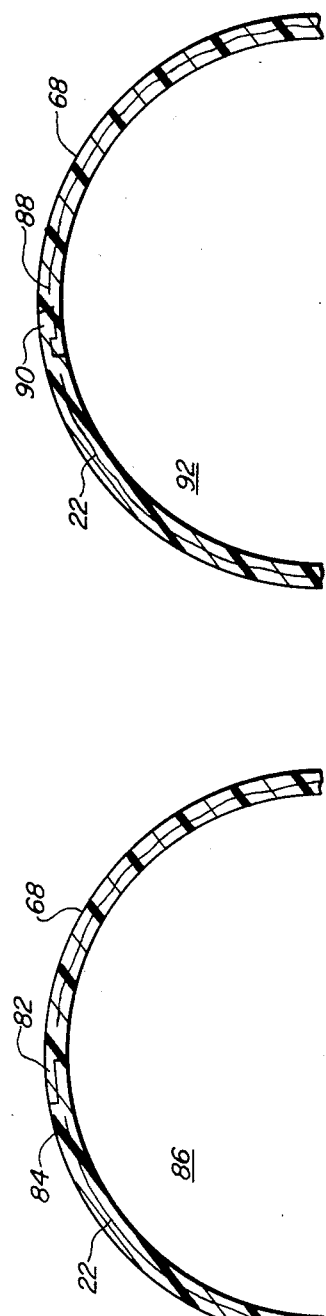
FIG. 6D
FIG. 6E

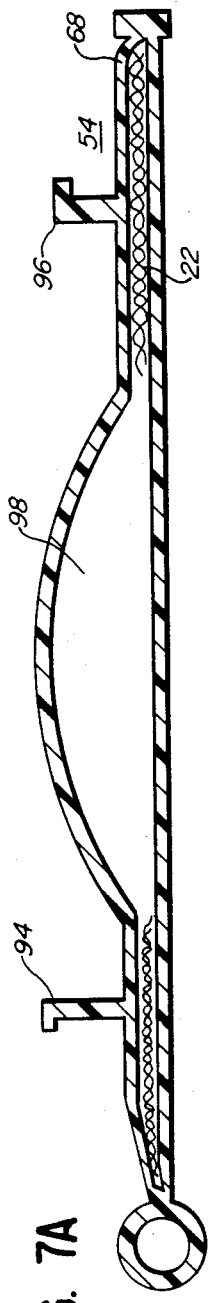
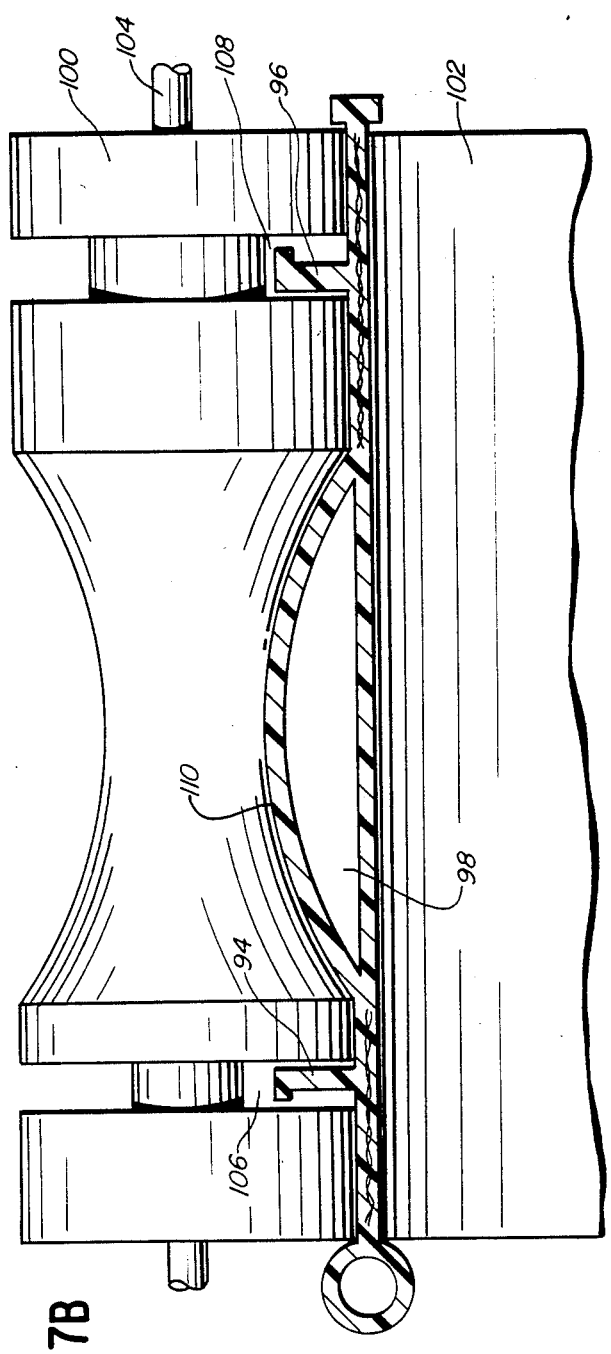
FIG. 7A
FIG. 7B

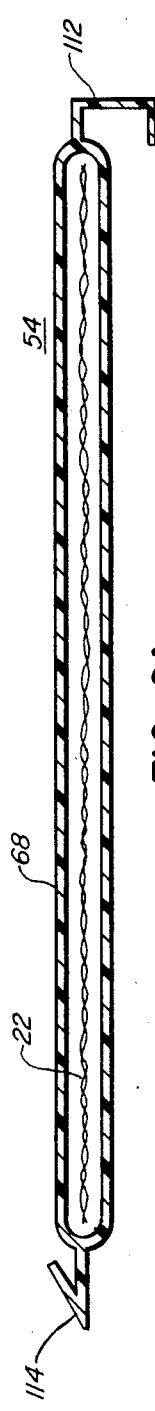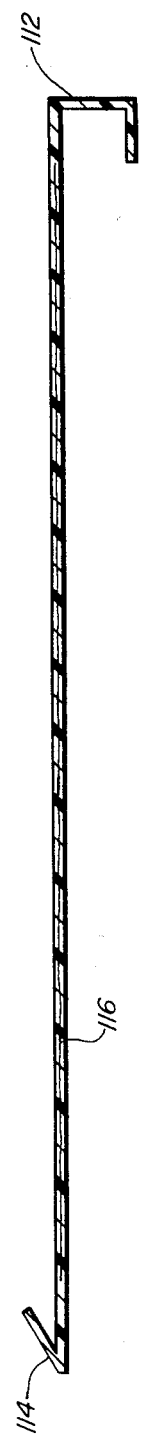
FIG. 8A
FIG. 8B

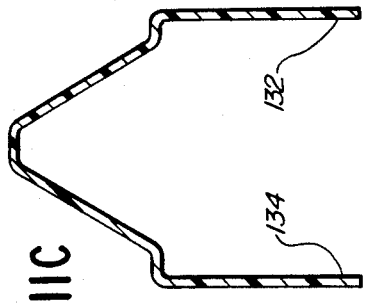
FIG. IIC
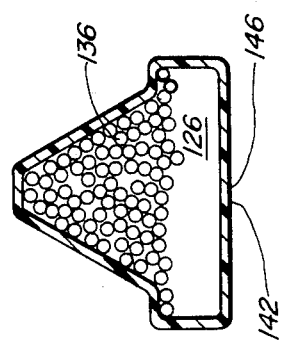
FIG. IIE
FIG. IIA
FIG. IIB
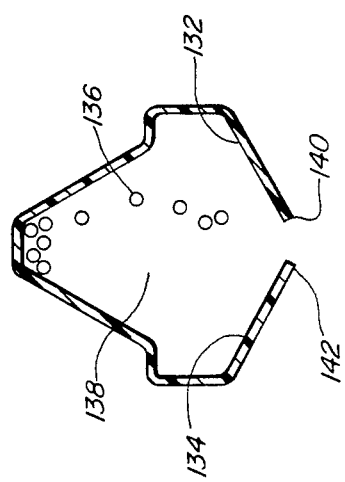
FIG. IID

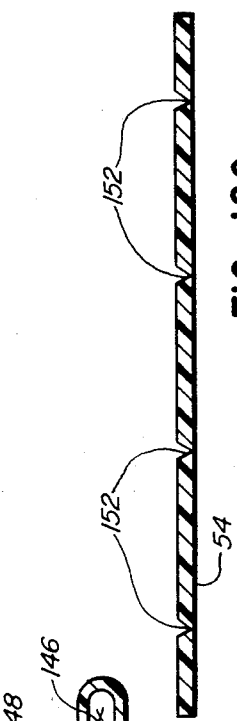
FIG. 12C
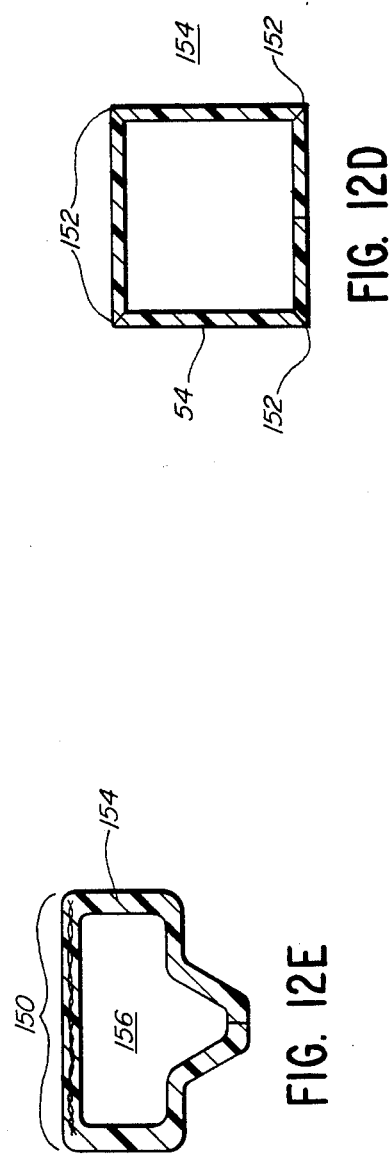
FIG. 12D
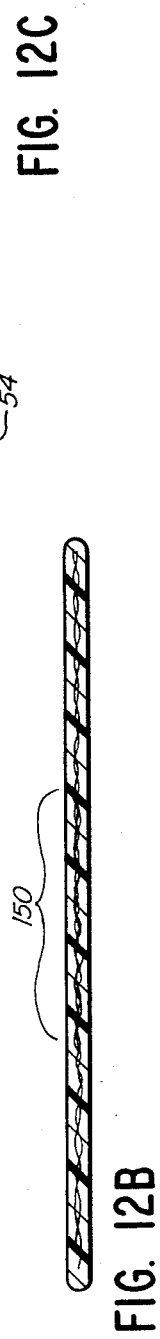
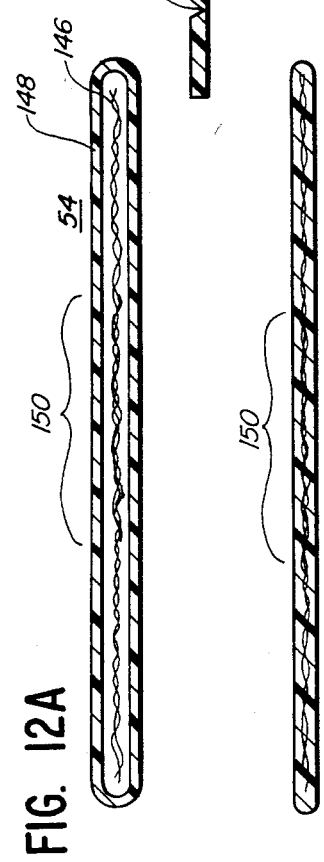
FIG. 12A
FIG. 12B
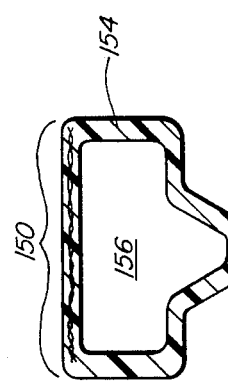
FIG. 12E

APPARATUS AND METHOD OF MAKING A REINFORCED PLASTIC LAMINATE STRUCTURE AND PRODUCTS RESULTING THEREFROM

This application is a division of application Ser. No. 784,423, filed Oct. 4, 1985, now abandoned.

FIELD OF THE INVENTION

This invention relates to a reinforced plastic laminate structure and to an apparatus and method for forming the reinforced structure. More particularly, the invention relates to an apparatus and method which extrudes a plastic while simultaneously introducing a reinforcing material such that the reinforcing material is encapsulated by a continuous plastic material.

BACKGROUND OF THE INVENTION

Sheets, tubes and other configurations of plastic materials are finding increasing use in a wide variety of applications today. The advent of low cost plastics has increased their availability as substitutes for traditional construction materials. Effective and economical reinforcing of these plastics to increase their strength while maintaining a cost advantage is still a problem.

A variety of methods have been used to encapsulate or otherwise combine a reinforcing material with a plastic material to form a laminate structure. For example, adhesives or heat can be used to combine two or more pieces of plastic material to encapsulate the reinforcing material. Several limitations and problems are present with such techniques. For example, the plastic is not one-piece or a continuous plastic material. Discontinuities in the plastic material may lead to delamination and degradation of the entire structure. An imperfect or partial encapsulation exposes the reinforcing material to potentially harmful environment, i.e. moisture, corrosives.

The manufacture of the laminate structure by known techniques can be complex. For example, the plastic material may be formed in a separate operation from the reinforcing material, necessitating additional manufacturing operations leading to quality control considerations and additional cost.

Another potential problem with known encapsulation methods is the lack of bonding or fusion between the reinforcing material and the plastic material. When adhesives are used, the strength of the structure is limited to the strength of the bonds between either the reinforcing material and the adhesive, the plastic material and the adhesive, or the adhesive itself. The weakest of these bonds limits the strength of the reinforced plastic material and thus its ability to substitute for traditional construction materials.

In particular, when using a fibrous reinforcing material, the fibers can appear on the surface of the laminate. This cosmetically detracts from the finish and increases the brittleness of the product. Also, the fibers are exposed to the environment and can absorb moisture, potentially causing structural failure or degradation of the laminate.

One method of forming a plastic laminate is disclosed in Japanese Patent Publication No. 37-7627 published July 9, 1962 from Patent Application No. 35-22059 filed Apr. 25, 1960 by Komatsu Chemical Products Company, Ltd. of Tokyo, Japan. This publication discloses a composite synthetic resin sheet that includes a laminate of surface synthetic resin layers and a middle layer of reinforcing sheet material such as wire netting and glass fabric. The process includes extruding a tubular synthetic resin material from a single extrusion machine through an annular die, cooling the resin to allow cutting, cutting the tubular resin material into two separate strips and flattening each of the strips by means of flat guide plates. Thereafter, the reinforcing sheeting material is fed between the two strips to a row press for combining them into a composite sheet. The resin material, after cutting, must be re-heated to complete the encapsulation of the reinforcing material. Since the reinforcing material is not encapsulated by a continuous structure, the slit area is subject to delamination.

Another method of forming a reinforced plastic sheet material is disclosed in U.S. Pat. No. 3,687,764. This patent discloses a web composed of uniformly arranged strands applied to the inner layer of a first thermoplastic sheet. A second thermoplastic sheet has its inner layer applied and contacting the first plastic sheet through the holes provided in the web. The web of reinforcing material may be made of woven or non-woven strands arranged in an open mesh network and may comprise inorganic material such as metals, glass and asbestos. Although the multilayer thermoplastic film avoids the necessity of applying adhesives, one of the layers of thermoplastic material must have a lower sealing temperature than the other thermoplastic material, resulting in a discontinuous structure of two different thermoplastic materials. A potential problem disclosed by the patent is the lack of bonding between the reinforcing material and the thermoplastic materials which weakens the laminate.

SUMMARY OF THE INVENTION

In accordance with the present invention, a reinforced plastic laminate structure is provided that comprises elongated reinforcing material encapsulated by an extruded plastic material forming a continuous structure around the reinforcing material. The problems with prior art attempts to improve reinforced plastic laminate structures discussed above are avoided by the present invention, resulting in economical, high-strength plastic laminate structure material.

In accordance with another aspect of the present invention, an apparatus for the production of a reinforced plastic laminate sheet is provided. The apparatus comprises an extruding machine for extruding plastic including an annular die having an annular opening for producing tubing. The annular die is attached to the extruding machine. The apparatus also includes a source of elongated reinforcing material, such as a roll of reinforcing material, and a mandrel connected to the annular opening. The mandrel has an inlet for receiving the reinforcing material from the reinforcing roll and feeding the reinforcing material through the die head on extruding machine to an outlet positioned in the center of the annular opening. Pressure rollers or other structure is provided to flatten the tubing after it exits the annular die with the reinforcing material between the flattened interior wall of the extruded tubing when entering the gap between the pressure rollers. The apparatus may also include take-up rollers or other structure for receiving the reinforced laminated sheet exiting the pressure rollers.

In accordance with yet another aspect of the present invention, a method of making a reinforced plastic laminate structure is provided that comprises extruding a tube of plastic material while simultaneously introducing an elongated reinforcing material within the interior of the tube. The method also includes flattening the interior wall of the tube into physical contact with the reinforcing material to encapsulate the reinforcing material in a continuous structure around the reinforcing material and to form a laminate structure. Preferably, the reinforcing material has a plurality of strands arranged in an open mesh network and the pressing step bonds the opposite interior sides of the plastic tubing through the mesh.

In accordance with other aspects of the present invention, a reinforced plastic spacer bar and a method for making it is provided. The spacer bar and method are useful for insulating glass constructions, for example.

The method comprises extruding a tube of plastic material while simultaneously introducing a reinforcing material within the interior of the tube. Thereafter, the tube is flattened so that the interior wall of the tube comes into contact with the reinforcing material to encapsulate the reinforcing material in a continuous structure of the plastic material that surrounds the reinforcing material and forms a laminate sheet. The method further comprises forming the laminate sheet, by bending, for example, to form a tube-like spacer bar by aligning in close proximity opposed ends of the laminate sheet. Preferably, a desiccant material is introduced and sealed within the interior of the formed spacer bar. The outer plastic surface may be coated with material such as metal foil. The surface of the spacer bar can be finished as desired.

In accordance with the invention, the reinforced plastic spacer bar comprises a laminate structure comprising an elongated reinforcing material surrounded by an extruded, flattened plastic tube having its interior wall flattened and in physical contact with and encapsulating the reinforcing material thereby providing a continuous plastic structure that surrounds the reinforcing material. A metal foil coating can optionally be applied over the plastic material. The laminate structure is folded to form the desired spacer bar configuration, which may be a duct or tube-like shape, for example. A desiccant material may be sealed inside the folded laminate structure.

The present invention also provides a reinforced plastic laminate structure that comprises an interior elongated reinforcing material and an exterior continuous plastic encapsulating material. The plastic encapsulating material is an extruded plastic tube having its interior wall flattened and thereby providing a continuous plastic structure around the reinforcing material in the form of a substantially flat laminate structure. Preferably, the reinforcing material comprises a plurality of strands arranged in an open mesh network and the plastic material is bonded between the mesh. The reinforcing material may be formed into a variety of useful products, such as siding, shingles, containers, tubing, fence pickets or posts, door jambs, door panels, floor panels, electromagnetic interference (EMI) shielded conduit or cable, wall panels and table tops, for example. The extruded tubing may incorporate a fastening structure or members or other projections on the tubing exterior, such as on opposed exterior locations. Such structure can be formed during extrusion or by other methods. For example, a tongue and groove fastening structure may be utilized.

DETAILED DESCRIPTION OF THE DRAWINGS

The present invention can be more completely understood by reference to the drawings, in which:

FIG. 6A is a side view in cross-section of a basic plastic laminate structure in accordance with the invention prior to flattening;

FIG. 6B is a side view in cross-section of a basic plastic laminate structure in accordance with the invention after flattening;

FIG. 6C is a side view in cross-section of a plastic laminate structure in accordance with the invention illustrating the fasteners on the opposing ends;

FIG. 6D is a partial side view in cross-section illustrating the fastening of the opposed ends to make a reinforced conduit in accordance with the invention;

FIG. 6E is a partial side view in cross-section illustrating the fastening of the opposed ends to make a reinforced conduit in accordance with another embodiment of the invention.

FIG. 7A is a side view in cross-section of a finished plastic laminate structure illustrating an air pocket and fasteners in accordance with the invention;

FIG. 7B is a side view of a plastic laminate structure illustrating an air pocket and fastener in accordance with the invention during flattening;

FIG. 8A is a side view in cross-section of reinforced vinyl siding being fabricated in accordance with the invention prior to flattening;

FIG. 8B is a side view in cross-section of the reinforced vinyl siding in accordance with the invention after flattening.

FIG. 11A is a side view in cross-section of a laminate sheet being fabricated in accordance with the invention with a metallic coating prior to flattening;

FIG. 11B is a side view in cross-section of the laminate sheet of FIG. 11A after flattening;

FIG. 11C is a side view of the flattened laminate structure of FIG. 11B after initial profiling;

FIG. 11D is a side view in cross-section of the laminate structure of FIG. 11C newly profiled;

FIG. 11E is a side view in cross-section of the laminate sheet in FIG. 11D profiled as a spacer bar.

FIG. 12A is a side view in cross-section of the laminate sheet being fabricated in accordance with the invention prior to flattening;

FIG. 12B is a side view in cross-section of the laminate sheet of FIG. 12A after flattening;

FIG. 12C is a side view of the pressed laminate structure of FIG. 12B after notching;

FIG. 12D is a side view in cross-section of the notched laminate sheet in FIG. 12C profiled as a rectangular bar;

FIG. 12E is a side sectional view of the rectangular bar in FIG. 12D profiled as a reinforced spacer bar.

DETAILED DESCRIPTION OF THE INVENTION

Figure 1:
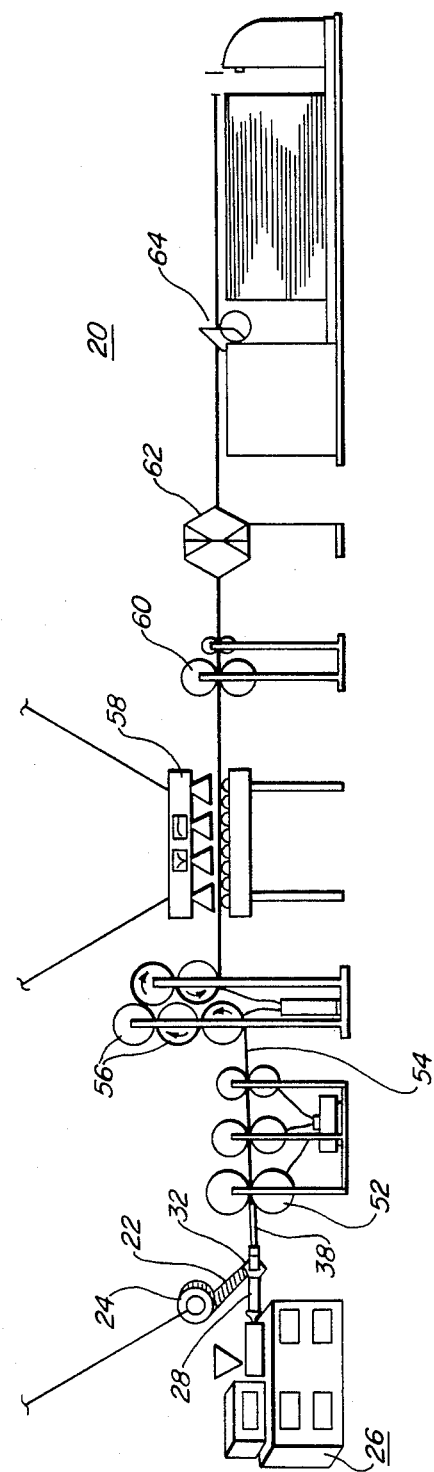
FIG. 1 is a schematic view of apparatus for the production of a reinforced plastic laminate sheet in accordance with the invention.

Referring to FIG. 1, the reinforced plastic laminate structure of the present invention may be made by the apparatus designated generally by the numeral 20. An elongated reinforcing material 22 is withdrawn from a supply roll 24 and fed into a plastic extruder generally designated as 26. The reinforcing material can be in any convenient form, such as a roll or sheet form, for example. If desired, the reinforcing material can be treated prior to use to enhance the bonding of the reinforcing material to the plastic.

Figure 2:
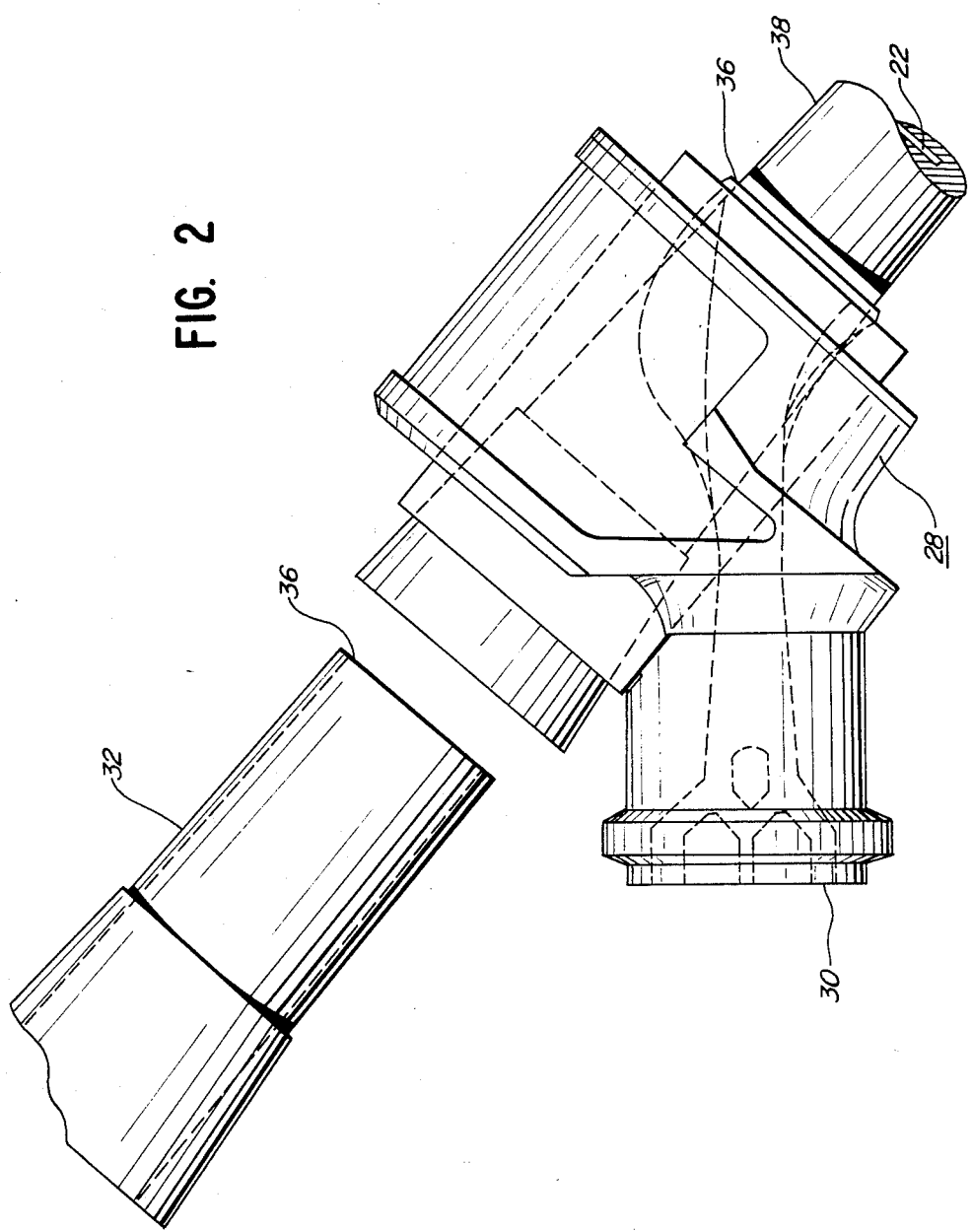
FIG. 2 is a top view of a 45° crosshead die extruder with the mandrel in an exploded view.

The extruder 26 has a pipe extrusion head shown in more detail as a 45° crosshead die 28 in FIG. 2. The crosshead 28 contains an orifice 30 for feeding the formable plastic (not shown) into a mandrel 32 illustrated in an exploded position. The reinforcing material 22 is fed through an input opening 34 into the center of the mandrel 32. The mandrel 32 positions the reinforcing material 22 exiting from an output opening 36 at the interior of an extruded tubing 38.

Preferably, elliptical tubing is extruded, although other configurations such as a conventional round tubing may also be used with the present invention. It is also preferred that the tubing is extruded with uniform pressure and stress at all points. It may be desired to vary the thickness of the plastic material around the tubing circumference or to extrude projections which extend outwardly from the edges of the tubing. For example, projections or fastening members suitable for siding, flooring or other uses can be extruded or otherwise formed or attached. These modifications are compatible with the present invention.

The reinforcing material 22 is supplied into the center of the mandrel 32 independently of the extrusion speed of the tubing 38. It may be desired to have discreet units of reinforcing material 22 added to the tubing 38 to provide reinforcement at predetermined sections of the completed laminate structure. This would facilitate forming of the material at those points where the reinforcing material 22 was purposefully omitted. If desired, more than one reinforcing material 22 or type or reinforcing material may be introduced through the mandrel 32 during the extrusion.

Figure 3:
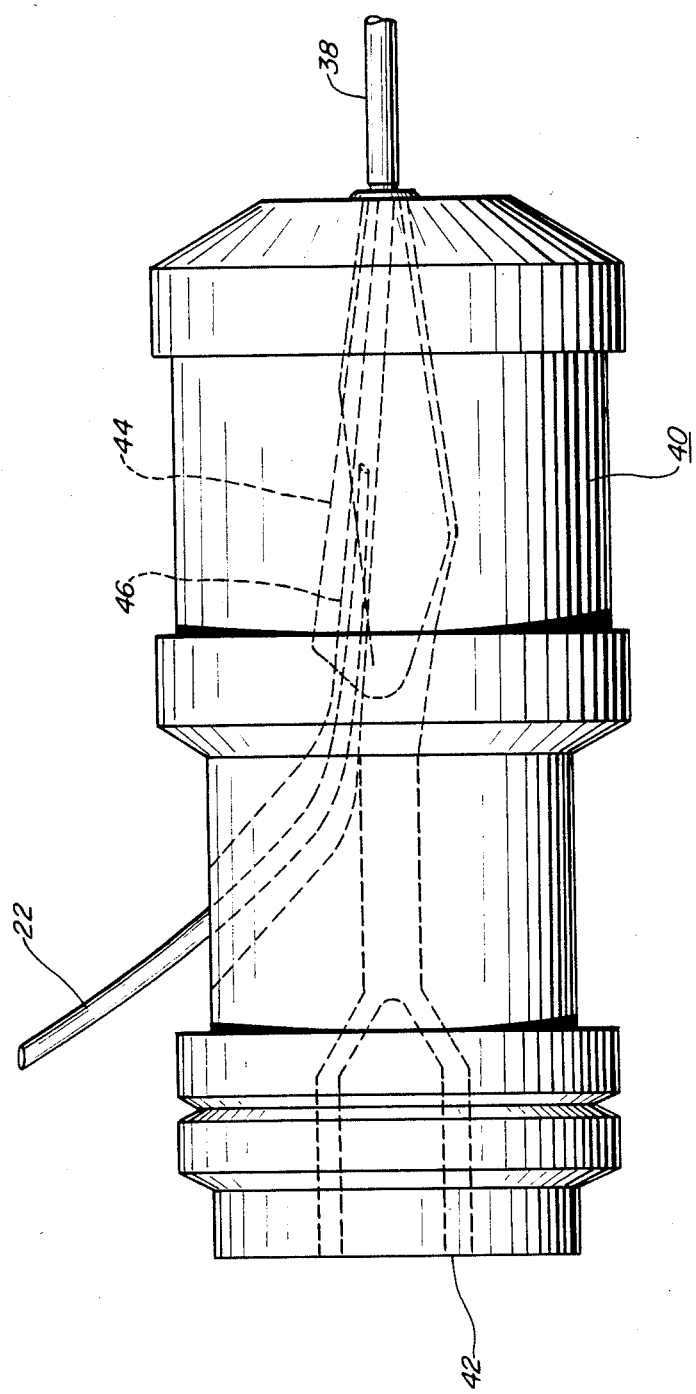
FIG. 3 is a side view of a straight head die extrusion head illustrating the internal conduits therein.

FIG. 3 illustrates a straight extrusion head die design 40. As depicted therein, an orifice 42 feeds the formable plastic (not shown) into an annular die 44. The reinforcing material 22 is fed through a mandrel 46 into the center of the die 44 to position the reinforcing material 22 in the interior of the extruded tubing 38.

Figure 4D:
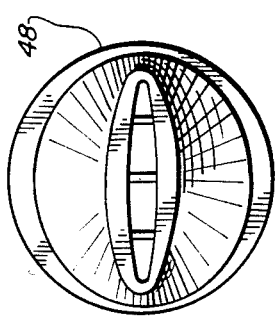
FIG. 4D is an end view of the mandrel in FIG. 4A.
Figure 4B:
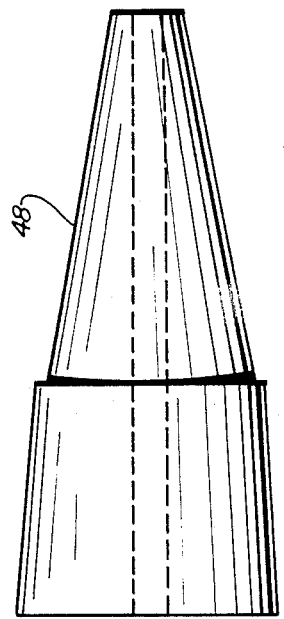
FIG. 4B is a side view of the mandrel in FIG. 4A.
Figure 4C:
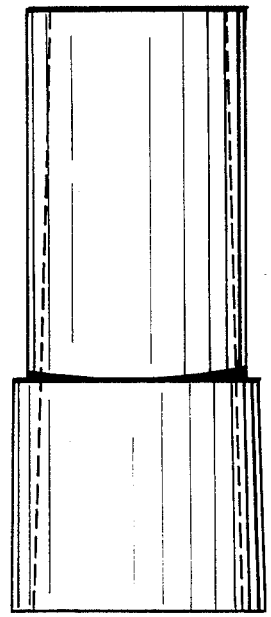
FIG. 4C is a top view of the mandrel in FIG. 4A.
Figure 4A:
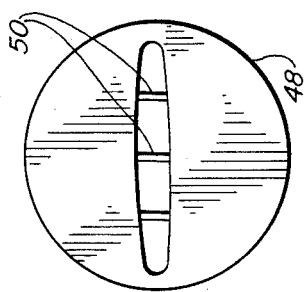
FIG. 4A is the front view of a mandrel.

An alternate mandrel design 48 is shown in FIGS. 4A through 4D uing spacer bars 50 best seen in the front view FIG. 4A. The spacer bars 50 center the reinforcing material in the interior of the extruded tubing (not shown). FIGS. 4B and 4C show the side and top views, respectively, of the mandrel 48. FIG. 4D illustrates the extruding end of the mandrel 48.

Returning to FIG. 1, the reinforcing material 22 is in contact with the lower half of the extruded tubing 38 as it exits the mandrel 32 at the same speed as the tubing 38 is extruded. Structure for guiding the reinforcing material 22 may be provided at the output opening 36 of the mandrel 32 for desired positioning in the completed laminate structure. The extruded tubing 38 with the reinforcing material 22 in its interior advances to the nap of at least one pair of pressure rollers 52. At this point, the plastic is still formable and is flattened to tightly unite in physical contact with the reinforcing material 22. Preferably, a reinforcing material with an open mesh network is used so that the pressure rollers force the plastic material 38 to penetrate the holes of the mesh and bond the two interior surfaces of the extruded tubing 38 through the mesh. Thus, a laminate structure 54 is formed.

After the laminate structure 54 has been formed, it may be subjected to additional processing, on a continuous or batch basis, for example. The laminate structure 54 may be processed with additional pairs of rollers 56 for polishing, embossing or texturing the surface.

The laminate structure 54 may be subsequently profiled into a variety of shapes. This is accomplished by heating the laminate structure sufficiently to soften the plastic material.

Heat can be applied by any conventional heating means 58 i.e. hot air, heat lamps, to keep the laminate structure sufficiently soft during the forming of its profile. The laminate structure 54 is advanced from the heating means 58 to a profile forming station 60 where its shape is completed by conventional devices exemplified by roll forming devices or calibrating dies which use vacuum, air blowers (hot or cold as needed), metal pressure dies and water cooling tanks. After forming a particular shape, the profile can be painted or have a print, decorative foil, or film applied.

After any processing operation it may be desired to advance the laminate structure 54 to a sizing station 62 where conventional cutting devices would size the laminate structure 54 to a predetermined length. Measuring devices, activated by electronic, magnetic or linear means, controls the sizing operation. Subsequently, the sized units may advance to stacking station 64 for convenient storage or shipping, for example.

Suitable materials for use with the invention include synthetic or natural resins and polymers that can be extruded. The term "plastic" as used herein includes all such materials. The plastic may be foamed, rigid or flexible, for example. Suitable synthetic polymers include, for example only and not as a limitation of the invention, copolymers of ethylene with acrylic acid, methacrylic acid, esters of acrylic acid, and esters of methacrylic acid, polyvinyl chloride, ABS, polystyrene, polyethylene, polypropylene, polycarbonate, nylons, rubbers, propylene copolymerized with other monomers, vinyl chloride or vinylidene chloride copolymers, polyvinylidene chloride, polyvinyl alcohol, polyesters, and the extrudable engineering plastics. Other suitable compounds include the alloys such as Rovel, a trademark of Dow Chemical, and Geloy, a trademark of General Electric.

More specifically, examples of suitable acrylic esters for polymerization with ethylene are allyl acrylate, methyl acrylate, ethyl acrylate, butyl acrylate, and octyl acrylate. Examples of suitable methacrylate esters are methyl methacrylate, ethyl methacrylate, n-butyl methacrylate, isobutyl methacrylate, cyclohexyl methacrylate, allyl methacrylate and lauryl methacrylate.

Examples of natural resins which are usable in the invention include, but are not limited to, natural rubber, bentonite asphalt, resin derivatives, and lignin products.

Two or more plastics can be coextruded. The different plastics may be chosen for different properties. For example, the extruded tube could have a top half of PVC and a bottom half of ABS. When flattened and formed into a tube or conduit, as hereinafter described in detail, the outer surface of the tube would have an exterior surface of PVC and an interior surface of ABS, or vice versa, as desired. The PVC exterior would possess good weatherability and the ABS interior would possess good low temperature resistance and strength.

The reinforcing material can be chosen from an extremely wide variety of materials and may be a solid material or a web of woven or non-woven strands arranged in an open mesh network. The strands may be composed of monofilament material or multifilament material. Natural or synthetic material may be used to form the individual strands or threads from multifilament stock. Strands may be monofilament synthetic material or multifilament synthetic materials such as viscose rayon, acetate rayon, polypropylene, polyvinyl chloride, polyvinylidene chloride, copolymers of vinyl chloride or vinylidene chloride, nylons, cellulose butyrate, polystyrene, polyester, polyvinyl alcohol, Eglass, fiberglass graphite and carbon, aramid and polymer fibers such as polypropylene, polyester, and nylon, for example. Suitable strands which are commercially available include: Campet, manufactured by Allied Chemical Company; Kevlar, manufactured by DuPont; Multiknit, manufactured by King Fiber Company of Arlington, West Virginia; Cofab, manufactured by Composite Reinforcement Business of Tuscaloosa, Alabama; and Fibaknit, manufactured by Mills of Midland, Ontario.

Inorganic materials may be used to form the strands, either of mono- or multifilament structure. Examples of inorganic material which can be used for forming the strands are metals, glass, asbestos and cellulose material.

Naturally occurring organic materials that can be spun into strands can be used to make the reinforcement material. Among those that have been found suitable are cotton, wool, hemp, and twisted paper for making the strands.

Fiber arrangements can be as desired, such as biaxial, weft-unidirectional, random warp-unidirectional, bias, and triaxial. The fiber arrangement can be chosen to allow process strength in both lateral and longitudinal directions, eliminating a common problem with pultruded shapes which are made with a fiber in roving form rather than woven mesh. Eliminating surface fibers prevents wicking and a smooth surface is achieved.

Metal strips or mesh, wire cloth, aluminum or galvanized screening and expanded metal also may be used, either alone or in combination with other reinforcing materials, such as natural or synthetic polymers, for example. When oxidizable metals such as aluminum or iron are used metallic degradation may be eliminated by the complete encapsulation. A metal strip also may be combined with a fiber mesh if a magnetic contact is desired, such as in weather stripping or sealing applications, for example.

Figure 5A:
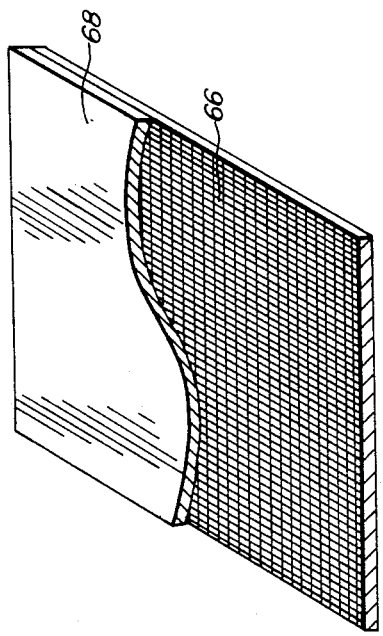
FIG. 5A is a perspective sectional view of a plastic laminate sheet in accordance with the invention.
Figure 5B:
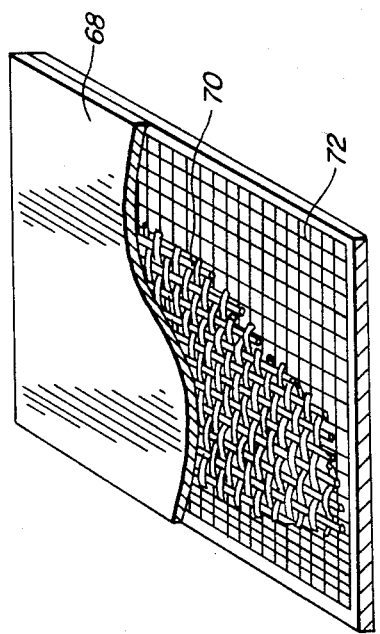
FIG. 5B is a perspective sectional view of another type of a plastic laminate sheet in accordance with the invention.
Figure 5C:
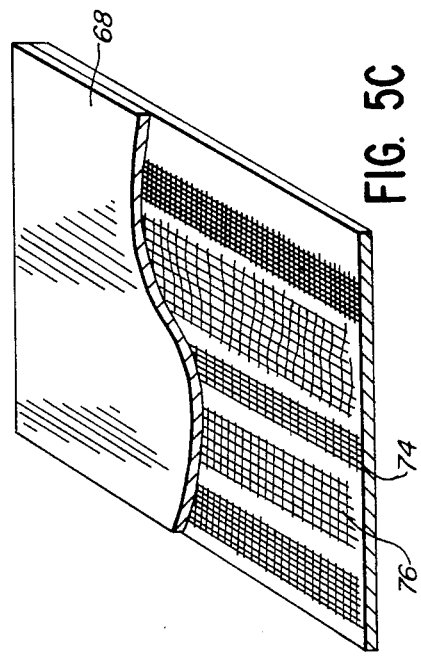
FIG. 5C is a perspective sectional view of still another type of a plastic laminate sheet in accordance with the invention.
Figure 5D:
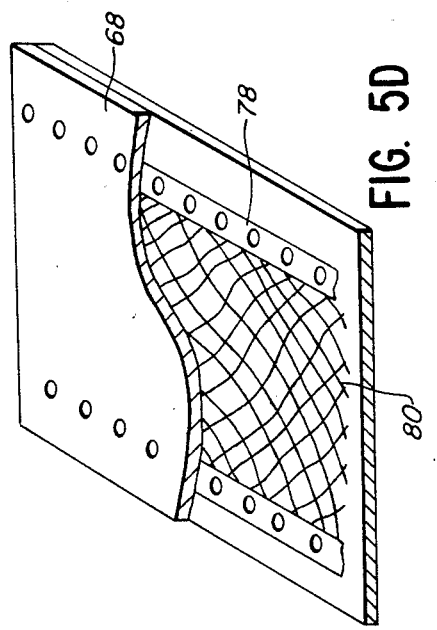
FIG. 5D is a perspective sectional view of yet another type of a plastic laminate sheet in accordance with the invention.

FIGS. 5A through 5D illustrate typical examples of a variety of reinforced materials that may be produced by the present invention. FIG. 5A illustrates a metal open mesh 66 which is encapsulated by a conventional plastic material 68. This product could be formed into a conduit, such as an EMI shielding conduit, for example. FIG. 5B illustrates two different reinforcing materials used simultaneously with an open mesh glass fiber 70 on top of a metal mesh 72 encapsulated by a conventional plastic 68. FIG. 5C illustrates using a reinforcing material with two different weaves having a slit fiber 74 and metal mesh 76 encapsulated by a conventional plastic 68. FIG. 5D illustrates metal strips 78 which are interlaced with a metal mesh 80 and further encapsulated by a plastic 68. For extreme strength, the reinforcing material can include high strength material, such as rods or cords (not shown) of suitable material (e.g. fiberglass or metal, for example). A metal mesh also can be used for EMI shielding inside the tube (not shown).

The basic laminate structure can be formed or profiled into a wide variety of shapes for applications which require additional strength. Referring to FIG. 6A, the reinforced material 22, preferably mesh, is surrounded by a continuous plastic structure 68 prior to pressing. FIG. 6B illustrates the resultant product after it is pressed to complete the laminate structure designated generally as 54. The plastic material 68 not only maintains its continuous structure around the mesh to encapsulate it, but also bonds or fuses through the mesh.

One application of the laminate structure 54 is for reinforced pipes or conduits. FIG. 6B illustrates the laminate structure 54 which has complementary fasteners 82, 84 attached to opposite ends. As illustrated in FIG. 6D, the laminate structure 54 is sufficiently flexible to fold and fasten the two opposing ends together to form a reinforced conduit 86. Another fastener embodiment is illustrated in FIG. 6C wherein the laminate structure 54 has complementary fasteners 88, 90 attached to opposite ends which are folded and fastened to form a reinforced conduit 92 in FIG. 6E. An adhesive could be used in addition to the fastener itself. Other types of fasteners or interlocking projections which bind the opposing ends together are suitable to make the reinforced conduit. Other methods of fastening the laminate in a manner to form a pipe or conduit can be used, such as adhesives, for example.

The invention contemplates positioning the fastening means at any point on the surface of the laminate sheet. For example, FIG. 7A illustrates fastening members 94, 96 provided by extrusion or other suitable means towards the center of the pre-flattened laminate structure 54 with the reinforcing material 22 extending partially across the structure 54 and encapsulated by plastic material 68. Also illustrated is an air pocket 98 which does not contain the reinforcing material 22. Since the fastener members 94, 96 and pocket 98 were provided prior to flattening in this example, FIG. 7B illustrates top and bottom pressure rollers 100, 102, respectively, modified accordingly to complete the flattening operation. The top roller 100 rotates on axis 104 and has a pair of depressions 106, 108 for accommodating fastener members 94, 96, respectively. Similarly, a pocket depression 110 prevents flattening on the pocket 98. All other areas along the length of the laminate structure 54 are flattened between rollers 100, 102.

FIG. 8A illustrates another application for the present invention when hook members 112, 114 are provided, by extrusion or other suitable means, on opposing ends of the pre-flattened laminate structure 54 with the reinforcing material 22 encapsulated by the plastic material 68. Generally, the hook members 112, 114 will be provided prior to flattening. FIG. 8B is the flattened laminate structure 54 forming a reinforced vinyl siding 116.

Generally, the invention produces articles like vinyl siding more economically than the prior art because less plastic material is used to make an article of equivalent strength. This is of particular concern when the costly engineering plastics are used. For example, PVC is often used to make siding. A thickness of 0.020 inch generally provides adequate protection against weathering. However, it is necessary to make PVC at least twice that thickness for adequate strength. Thus, more plastic is needed.

Figure 9A:
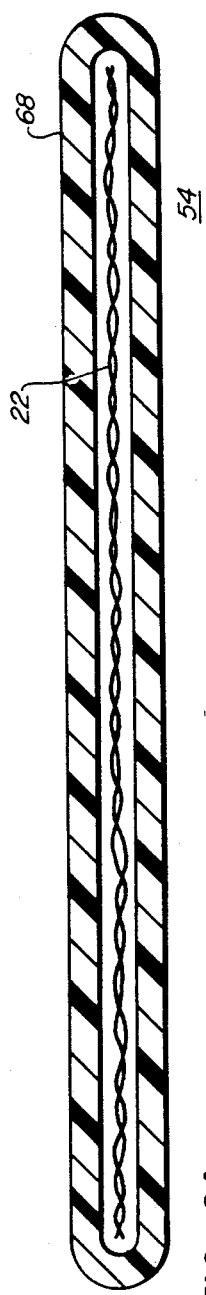
FIG. 9A is a side view in cross-section of a basic laminate structure in accordance with the invention prior to profiling.
Figure 9B:
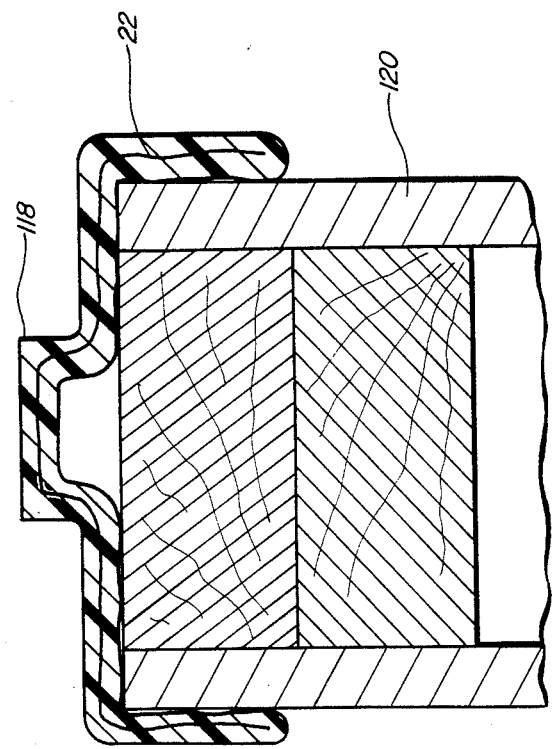
FIG. 9B is a side view in cross-section of the basic laminate structure of FIG. 9A profiled as a door jamb.

An example of the profile that may be formed starts with the pre-flattened laminate structure 54 having the reinforcing material 22 encapsulated by the plastic material 68 illustrated in FIG. 9A. FIG. 9B shows the flattened laminate structure 54 profiled as a door jamb 118 to frictionally engage the edges of a door 120.

Figure 10A:
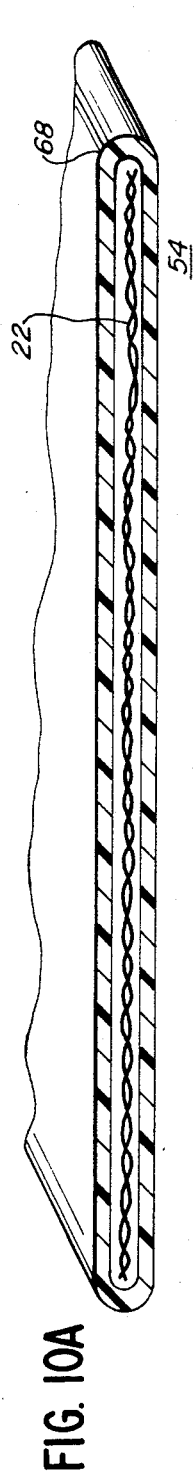
FIG. 10A is a side view in cross-section of a basic laminate sheet in accordance with the invention prior to profiling.
Figure 10B:
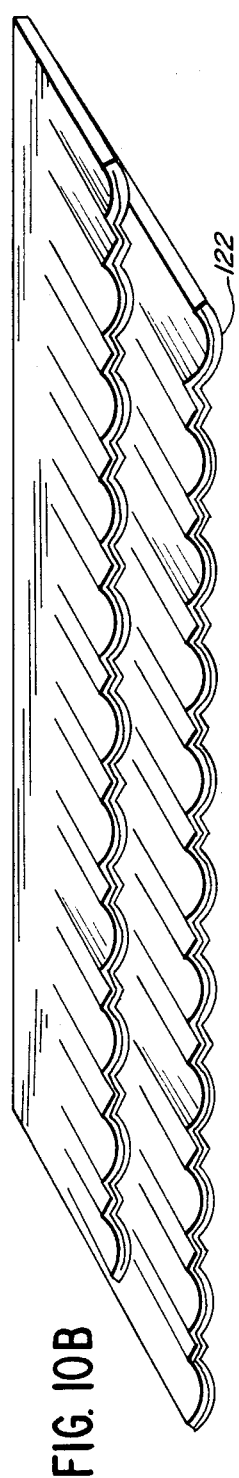
FIG. 10B is a perspective view of the laminate sheet in FIG. 10A profiled as a curved shingle tile pattern.
Figure 10C:
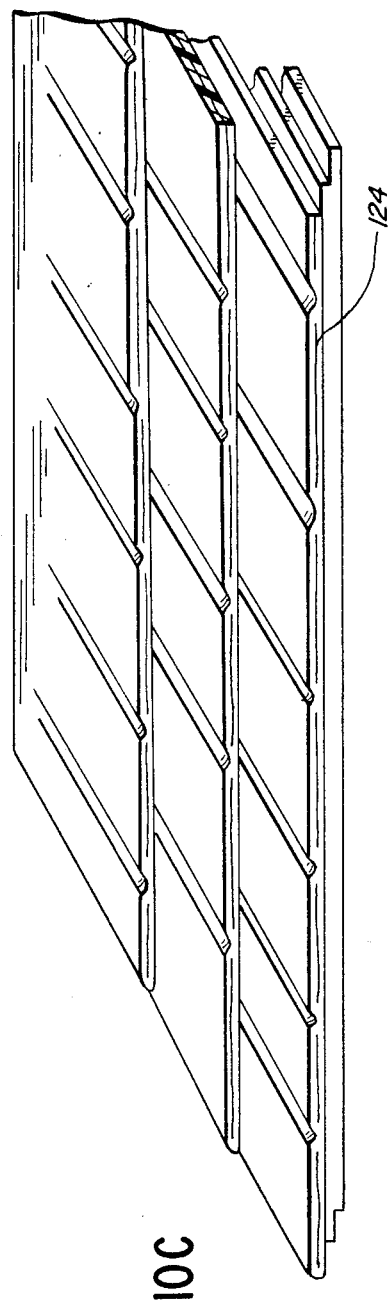
FIG. 10C is a perspective view of the laminate sheet of FIG. 10A profiled as a cedar shake shingle pattern.

An illustration of the decorative finish that may be used with the present invention starts by taking a pre-flattened laminate structure 54 having the reinforcing material 22 encapsulated by the plastic material 68 shown in 10A and forming a wide variety of tile patterns. FIG. 10B illustrates a curve tile pattern 122 and FIG. 10C a cedar shake shingle pattern 124. The use of vinyl roofing panels is made possible because the amount of thermal expansion and contraction is greatly reduced. Such expansion and contraction is one of the problems faced by the use of plastics in outdoor products. Prior to the present invention, there did not exist a practical solution.

The reinforcing material also increases the tensile and impact strength of the plastic. The tensile strength can be controlled by adjusting the caliber and mesh of the reinforcing material. Prior to the invention, adding fibrous material to a plastic granule for reinforcement before molding or extruding left the article brittle. In addition, the fibers would come into direct contact with the barrel or screw of the extruder, thereby impairing the flow of the plastic and causing additional wear on the extruder. These problems are avoided by the present invention. The amount of fiber added to the plastic granules was also limited. Now articles can be made with improved stiffness and impact resistance. The invention also allows complete flexibility in selecting the ratio between the plastic and reinforcing material.

Furthermore, the reinforcing material increases the article's resistance to distortion of the plastic at higher temperatures. This allows the use of dark colors for plastics which would be exposed to outdoor conditions. Prior to the invention there was not a practical way to provide such colors for plastic siding and other materials that can be exposed to direct sunlight. The heat distortion temperature of vinyl is approximately 160° F. This is often inadequate to sustain long hours under direct sunlight. The use of appropriate reinforcing mesh material having suitable heat resistance increases the distortion free extrusion above 180° F. which makes it available for use outdoors.

The invention permits the economical production of such articles as spacer bars which are used for insulated glass systems. These extrusions often have complex profiles with a coating on the laminate structure itself. Referring to FIG. 11A, a laminate structure 54 prior to flattening is shown with fiberglass mesh 126 as a reinforcing material encapsulated by a vinyl tube 128. Typically the vinyl tube 128 would be about 0.015 inches thick. Encapsulating both the vinyl tube 128 and the fiberglass mesh 126 is a metal foil 130 on the exterior which would typically be about 0.006 inches thick. FIG. 11B shows the laminate sheet 54 after flattening.

FIG. 11C shows the initial bends to form interior walls 132 and 134. FIG. 11D shows the injection of a desiccant material 136 into an interior area 138 formed by bending interior walls 132 and 134 into and opposing ends 140 and 142 in close proximity to each other. FIG. 11E shows the completed product with the desiccant material 138 sealed in the spacer bar 144.

The barrier film (not shown) can be applied to the extruded tubing prior to it being flattened into a laminate structure 54. A barrier film could be co-extruded or tri-extruded for higher efficiency and reduced costs. A barrier film prevents the penetration by vapor or moisture. Suitable barrier films include, but are not limited to, Saran, Selar (manufactured by DuPont), ethylene vinyl alcohol, Exceed (manufactured by O'Kura Kygyo), and polyvinyl dichloride. It may be desired to add a decorative film (not shown) to the bottom of the extruded tube. Such decorative films commercially available are wood grain vinyls, Tedlar (manufactured by DuPont), or a weatherable vinyl capping compound such as available from B. F. Goodrich Company or aluminum foils.

The invention provides high-strength profiles while eliminating expensive and time-consuming assembly steps. Using the spacer bar as an example and referring to FIG. 12A, a laminate structure 54 prior to flattening is illustrated with fiberglass mesh 146 as a reinforcing material encapsulated by a vinyl tube 148. Additional reinforcing material is provided in the back-web area designate by numeral 150. FIG. 12B shows the laminate sheet 54 after flattening.

FIG. 12C illustrates the placement of V-shaped notches 152 in the laminate sheet 54 at the points where bends will be made. FIG. 12D shows a rectangular tube 154 formed by bending the laminate sheet 54 at the notches 152. The invention eliminates the need for braising, welding, or gluing the corners of the rectangular tube 154. When the rectangular tube 154 is completed as a spacer bar 156 shown in FIG. 12E, the back-web area 150 provides sufficient strength to bend the spacer bar 156 to the angle desired. Thus, a high-strength spacer bar 156 is formed without expensive subsequent assembly operations.

Modifications and variations of the present invention are possible in light of the above teachings. It is, therefore, to be understood that within the scope of the appended claims the invention may be practiced otherwise than as specifically described.

I claim:

1. A reinforced plastic laminate structure comprising:
   an elongated reinforcing material; and an extruded flattened solid wall plastic tube having its interior wall flattened and in physical contact with and forming a continuous structure around said reinforcing material and forming a substantially flat laminate structure, said flattened tube including extruded fastening means along at least a portion of an edge of said structure.

2. The reinforced structure of claim 1 wherein said fastening means is integral with said flattened plastic tube.

3. The reinforced structure of claim 2 wherein said fastening means are located along opposed exterior edges of said laminate structure.

4. A reinforced plastic laminate structure comprising: an elongated reinforcing material; and
an extruded flattened solid wall plastic tube having its interior wall flatened and in physical contact with and forming a continuous structure around said reinforcing material and forming a substantially flat laminate structure, said flattened tube including two opposed edges, said edges having fastening means capable of complementarily engaging and interlocking each other to form a reinforced conduit.

5. The reinforced structure of claim 4 fastened at the edges to form a tube.

6. The reinforced structure of claim 4 fastened at the edges to form a container.

7. A reinforced plastic spacer bar comprising:

a laminate structure comprising an elongated reinforcing material and an extruded flattened solid wall plastic tube having its interior wall flattened and in physical contact with and forming a continuous structure around said reinforcing material forming a laminate structure;

said laminate structure having two opposed ends aligned in close proximity and defining the shape of said spacer bar.

8. The reinforced spacer bar of claim 7, wherein said reinforcing material is a plurality of strands arranged in an open mesh network, said plastic material bonded through said mesh.

9. The reinforced spacer bar of claim 7, wherein said reinforcing material is fiberglass.

10. The reinforced spacer bar of claim 7, further comprising a metal foil applied over said plastic tube, said metal foil selected from the group consisting of aluminum and galvanized steel.

11. The reinforced spacer bar of claim 7, wherein said reinforcing material is a plurality of discontinuous segments sized and spaced to allow folding of said laminate structure at points where said reinforcing material is omitted.

12. The reinforced spacer bar of claim 7 further comprises dessicant material within said spacer bar.

13. The reinforced spacer bar of claim 7 further comprising metal foil bonded to said laminated structure.

* * * * *